United States Patent
Yamamoto

(10) Patent No.: US 11,103,933 B2
(45) Date of Patent: Aug. 31, 2021

(54) STEP DRILL AND MANUFACTURING METHOD FOR STEP DRILL

(71) Applicant: OSG CORPORATION, Toyokawa (JP)

(72) Inventor: Takahiro Yamamoto, Toyokawa (JP)

(73) Assignee: OSG CORPORATION, Aichi (JP)

(*) Notice: Subject to any disclaimer, the term of this patent is extended or adjusted under 35 U.S.C. 154(b) by 157 days.

(21) Appl. No.: 16/094,313

(22) PCT Filed: Jan. 22, 2018

(86) PCT No.: PCT/JP2018/001761
§ 371 (c)(1),
(2) Date: Jul. 25, 2019

(87) PCT Pub. No.: WO2019/142355
PCT Pub. Date: Jul. 25, 2019

(65) Prior Publication Data
US 2021/0229189 A1  Jul. 29, 2021

(51) Int. Cl.
B23B 51/00 (2006.01)

(52) U.S. Cl.
CPC ........ B23B 51/009 (2013.01); *B23B 2251/24* (2013.01); *Y10T 408/906* (2015.01)

(58) Field of Classification Search
CPC .......................... B23B 51/009; Y10T 408/906
See application file for complete search history.

(56) References Cited

U.S. PATENT DOCUMENTS

| 1,747,117 A | * | 2/1930 | Klein | ............ B23B 51/10 |
| | | | | 76/108.6 |
| 10,315,257 B2 | * | 6/2019 | Ogawa | ............ B23B 51/009 |

(Continued)

FOREIGN PATENT DOCUMENTS

| CN | 2231586 Y | 7/1996 |
| CN | 201008996 Y | 1/2008 |
| CN | 202606942 U | 12/2012 |

(Continued)

OTHER PUBLICATIONS

Office Action dated Feb. 24, 2020, issued in counterpart KR Application No. 10-2018-7038021, with English ranslation (10 pages).

(Continued)

*Primary Examiner* — Eric A. Gates
(74) *Attorney, Agent, or Firm* — Westerman, Hattori, Daniels & Adrian, LLP

(57) ABSTRACT

A step drill and a manufacturing method for a step drill in which cutting performance of a cutting edge of a step portion can be enhanced are provided. A groove includes a first ground portion forming an area embracing a second cutting edge of the step portion and a second ground portion forming an area on the heel side of the step portion relative to the first ground portion. Therefore, a convex blade part can be formed on a first cutting edge by performing grinding with the first ground portion and the second ground portion intersecting with each other. That is, it is possible to form the second cutting edge into a desired shape during grinding of the first ground portion. Therefore, cutting performance of the second cutting edge can be enhanced.

6 Claims, 4 Drawing Sheets

(56) References Cited

U.S. PATENT DOCUMENTS

2014/0363249 A1* 12/2014 Oka .................. B23B 51/02
408/224
2015/0093205 A1* 4/2015 Krenzer ............. B23B 51/009
408/1 R

FOREIGN PATENT DOCUMENTS

| CN | 104379284 A | 2/2015 |
| CN | 104816025 A | 8/2015 |
| CN | 205147411 U | 4/2016 |
| CN | 205967538 U | 2/2017 |
| CN | 107262786 A | 10/2017 |
| DE | 20318529 U1 | 4/2005 |
| EP | 2 857 131 A1 | 4/2015 |
| JP | 5-53817 U | 7/1993 |
| JP | 2001-105216 A | 4/2001 |
| JP | 2002200511 A * | 7/2002 |
| JP | 2003-25125 A | 1/2003 |
| JP | 2003-334709 A | 11/2003 |
| JP | 2010-131736 A | 6/2010 |
| JP | 2013-252610 A | 12/2013 |
| JP | 2014-69246 A | 4/2014 |
| NO | 2015/118684 A1 | 8/2015 |
| WO | 2013/179417 A1 | 12/2013 |

OTHER PUBLICATIONS

Office Action dated Apr. 9, 2020, issued in counterpart CN Application No. 201880001172.7, with English translation (9 pages).
International Search Report dated Apr. 3, 2018, issued in counterpart application No. PCT/JP2018/001761 (3 pages).
English translation of Written Opinion dated Apr. 3, 2018, issued in counterpart Application No. PCT/JP2018/001761. (4 pages).
Extended European Search Report dated Oct. 1, 2020, issued in counterpart EP Application No. 18773065.0 (5 pages).

* cited by examiner

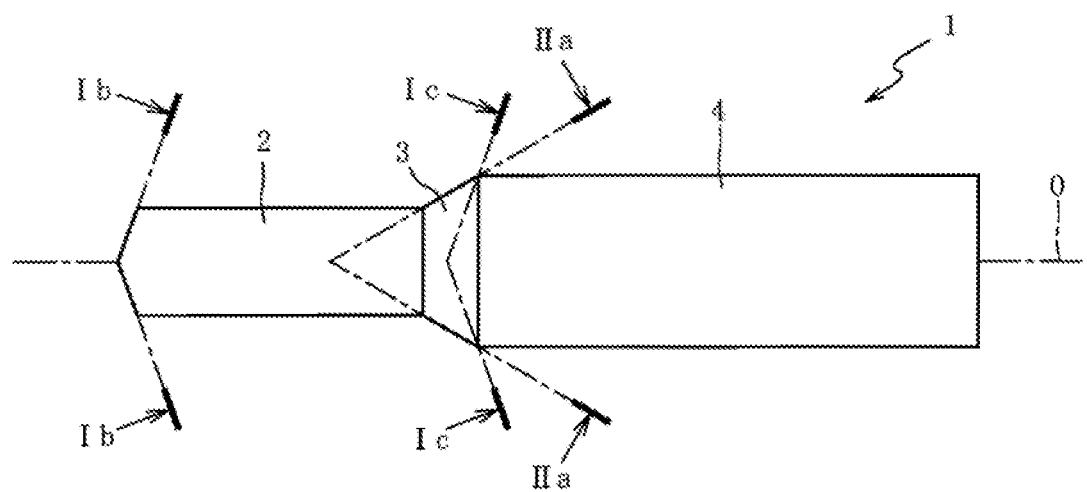
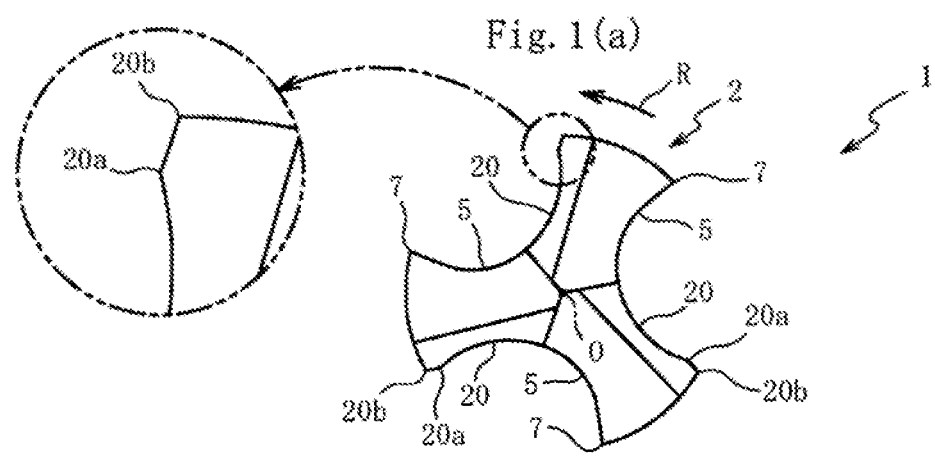
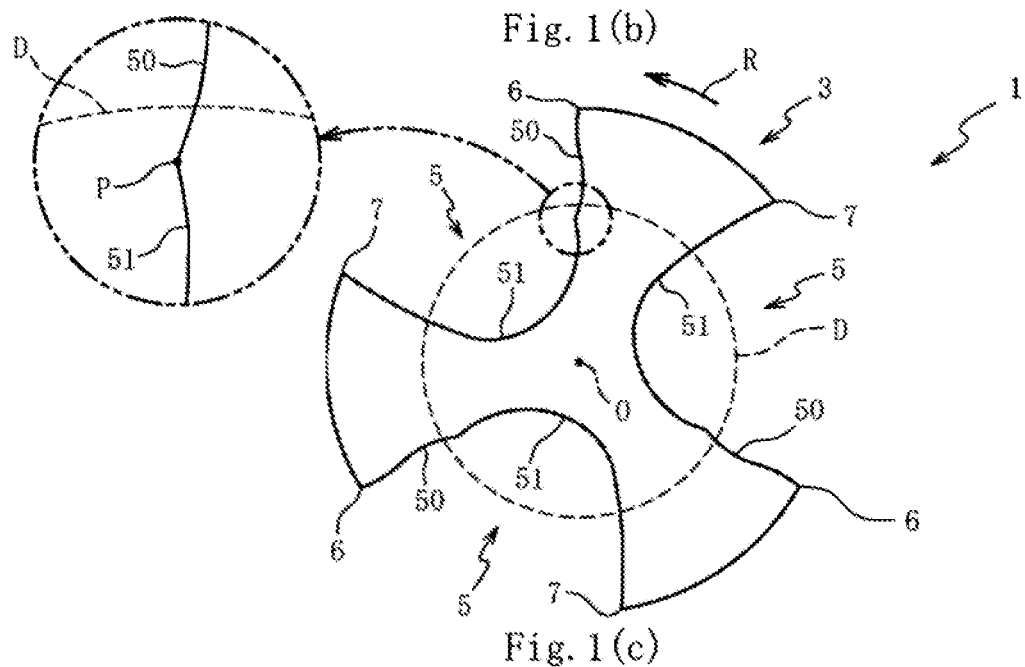
Fig. 1(a)
Fig. 1(b)
Fig. 1(c)

STEP DRILL AND MANUFACTURING METHOD FOR STEP DRILL

TECHNICAL FIELD

The present invention relates to step drills and manufacturing methods for step drills and in particular to a step drill and a manufacturing method for a step drill in which cutting performance of a cutting edge of a step portion can be enhanced.

BACKGROUND ART

There is known a step drill including a tapered step portion connecting a small-diameter portion and a large-diameter portion and having a cutting edge formed in the step portion. When a groove with a constant lead is formed in an area extending from the small-diameter portion to the step portion in one pass of grinding on such a step drill as described in Patent Literature 1, a cutting edge of the step portion is prone to be formed in the shape of a curve convex toward the direction of rotation of the drill. Consequently, a radial rake angle of the cutting edge of the step portion becomes a large negative angle and cutting performance of the cutting edge of the step portion is degraded.

CITATION LIST

Patent Literature

Patent Literature 1: JP-UM-A-05-053817 (For example, Paragraph 0006, FIG. 5)
Patent Literature 2: JP-A-2003-025125 (For example, Paragraph 0017, FIG. 1)

SUMMARY OF INVENTION

Technical Problem

For example, Patent Literature 2 describes a technology in which cutting performance is enhanced by providing on the circumferential end side of a cutting edge at the tip portion of a drill with a convex blade part (convex curved cutting edge portion) convex in the direction of rotation of the drill. However, when the cutting edge of the small-diameter portion of the above-mentioned step drill is provided with a convex blade part, a problem that the radial rake angle of the cutting edge of the step portion is prone to be a larger negative angle. A description will be given to this problem with reference to FIGS. 4(a) and 4(b). FIG. 4(a) is a schematic drawing illustrating a conventional method for grinding a groove 205 in a step drill 201 and FIG. 4(b) is a partial enlarged side view of a conventional step drill 201.

As illustrated in FIG. 4(a), when a convex blade part (not shown) is formed in a cutting edge at the tip portion of the small-diameter portion 202, the groove 205 is ground with a grind stone S provided with a predetermined swing angle θ relative to a desired helix angle of the groove 205. Owing to interference between the grind stone S having this swing angle θ and the small-diameter portion 202, a convex blade part can be formed on the circumferential end side of the cutting edge of the small-diameter portion 202. Meanwhile, as the result of the grind stone S having a swing angle θ, interference between the grind stone S and the step portion 203 is increased also during grinding of the step portion 203 and the large-diameter portion 204.

Therefore, the cutting edge 230 of the step portion 203 is formed in the shape of a curve convex toward the direction of rotation of the step drill 201 as illustrated in FIG. 4(b), and the radial rake angle of the cutting edge 230 of the step portion 203 is prone to be a larger negative angle. When countersinking (chamfering on a hole drilled with the small-diameter portion 202) is performed with the cutting edge 230 in this shape, a surface roughness failure in the chamfered area or surface tearing occurs. That is, the conventional step drill 201 having a convex blade part at the cutting edge of the small-diameter portion 202 poses a problem of degradation in cutting performance of the cutting edge 230 of the step portion 203.

The present invention has been made to solve the above-mentioned problem and it is an object of the present invention to provide a step drill and a manufacturing method for a step drill in which cutting performance of a cutting edge of a step portion can be enhanced.

Solution to Problem

To achieve this purpose, a step drill of the present invention includes: a small-diameter portion having a first cutting edge at the tip of the small-diameter portion; a tapered step portion connected to the axial rear end of the small-diameter portion and having a second cutting edge; and a groove formed with a constant lead in an area extending from the small-diameter portion to the step portion. The first cutting edge includes a convex blade part formed on the circumferential end side of the first cutting edge and convex in the direction of rotation of the small-diameter portion. The groove includes a first ground portion forming an area embracing the second cutting edge of the step portion and a second ground portion forming an area located between the first ground portion and the heel side of the step portion. The above-mentioned convex blade part is formed by the intersection between the first ground portion and the second ground portion.

Advantageous Effects of Invention

According to a step drill described in a first aspect and a manufacturing method for a step drill described in a third aspect, the first cutting edge includes a convex blade part formed on the circumferential end side of the first cutting edge and convex in the direction of rotation of the small-diameter portion. Therefore, cutting performance (cutting quality) of the first cutting edge is enhanced. In this case, the groove includes a first ground portion forming an area embracing the second cutting edge of the step portion and a second ground portion forming an area located between the first ground portion and the heel side of the step portion. Therefore, a convex blade part can be formed at the first cutting edge by grinding a groove with the first ground portion and the second ground portion intersecting with each other during two passes of groove grinding: a step (first step) of grinding the first ground portion and a step (second step) of grinding the second ground portion. That is, the second cutting edge can be formed into a desired shape during grinding of the first ground portion (at the first step) and further a grind stone can be suppressed from interfering with the second cutting edge during grinding of the second ground portion (at the second step). Therefore, a radial rake angle of the second cutting edge can be suppressed from becoming a large negative angle. This brings about an effect that cutting performance of the second cutting edge can be enhanced.

According to a step drill described in a second aspect and a manufacturing method for a step drill described in a fourth aspect, the second cutting edge is substantially linearly formed toward the circumferential end of the second cutting edge; therefore, an effect that cutting performance of the second cutting edge can be enhanced is brought about in addition to the effect brought about by the step drill described in the first aspect and the manufacturing method of the step drill described in the third aspect.

Here, "substantially linearly" is defined so as to include a configuration in which the second cutting edge is formed in the shape of a gentle curve convex in the direction of rotation of the step portion. In cases where the second cutting edge is formed in such a curved shape, a radial rake angle of the circumferential end side of the second cutting edge only has to be set to an angle not less than such an angle (for example, −20°) that degradation in cutting performance can be suppressed.

According to a manufacturing method for a step drill described in a fifth aspect, the second step is performed after the first step; therefore, the second cutting edge can be easily formed in addition to the effect brought about by the manufacturing method for the step drill described in the third aspect. A more specific description will be given. When the second step is performed first, it is necessary to adjust the dimensions of land width (width from the leading edge to the heel) while forming the second cutting edge at the first step. Meanwhile, when the first step is performed first, it can be made unnecessary to adjust the dimensions of land width while forming the second cutting edge. Thus, the second cutting edge can be easily formed into a desired shape and this brings about an effect that cutting performance of the second cutting edge can be enhanced.

BRIEF DESCRIPTION OF DRAWINGS

FIG. 1(a) is a side view schematically illustrating a step drill in an embodiment of the present invention;

FIG. 1(b) is a sectional view of the step drill taken along line Ib-Ib of FIG. 1(a);

FIG. 1(c) is a sectional view of the step drill taken along line Ic-Ic of FIG. 1(a);

DESCRIPTION OF EMBODIMENTS

Figure 2A:
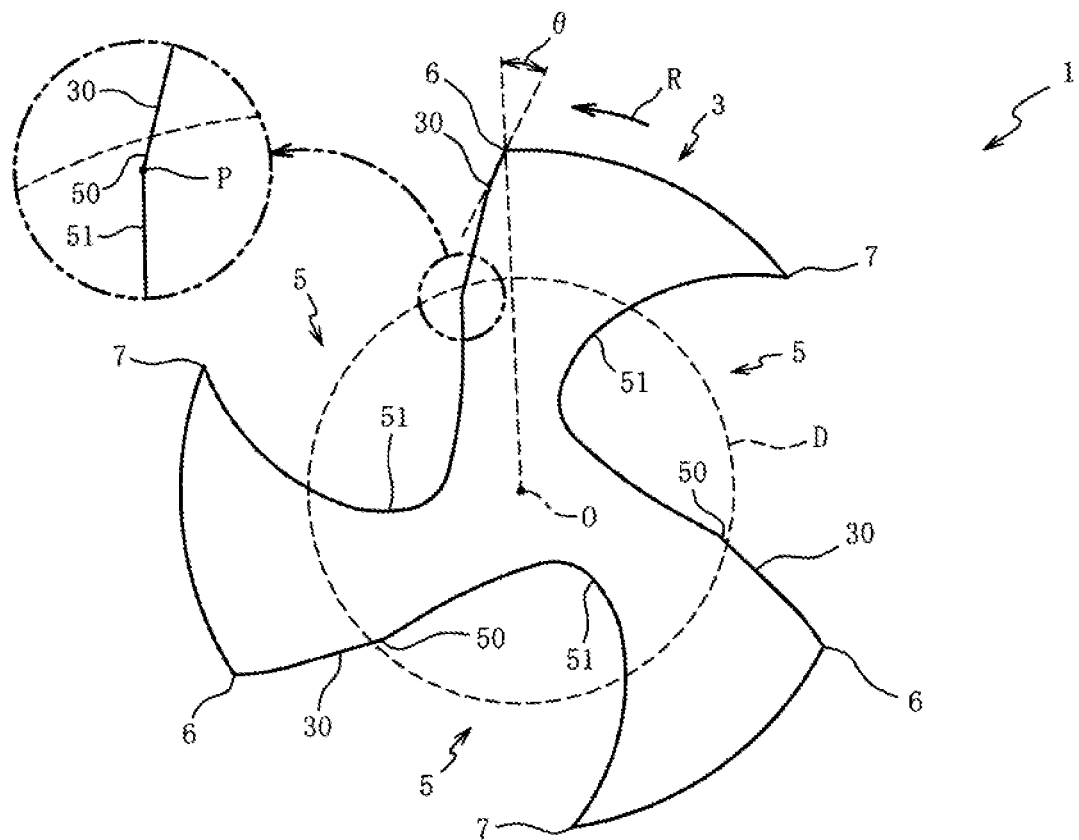
FIG. 2(a) is a sectional view of the step drill taken along line IIa-IIa of FIG. 1(a)

Hereafter, a description will be given to embodiments of the present invention with reference to the accompanying drawings. First, a description will be given to a general configuration of a step drill 1 with reference to FIG. 1(a). FIG. 1(a) is a side view schematically illustrating the step drill 1 in an embodiment of the present invention.

As illustrate in FIG. 1(a), the step drill 1 is a cutting tool that performs drilling or chamfering on a workpiece by turning force transmitted from a machine tool (for example, machining center) and is formed of cemented carbide obtained by pressure sintering tungsten carbide (WC) or the like.

The step drill 1 includes: a small-diameter portion 2; a step portion 3 connected to the rear end (right end portion in FIG. 1(a)) of the small-diameter portion 2; a large-diameter portion 4 connected to the rear end of the step portion 3 and formed with a larger diameter than the small-diameter portion 2; and a spiral groove 5 formed in the circumferential surfaces of the small-diameter portion 2, the step portion 3, and the large-diameter portion 4 (Refer to FIG. 1(b)).

The small-diameter portion 2, the step portion 3, and the large-diameter portion 4 are integrally formed in the direction of an axis O making the axes of these portions. The step portion 3 is formed in the shape of a taper whose diameter is continuously varied from the diameter (5 mm in this embodiment) of the small-diameter portion 2 to the diameter (8 mm in this embodiment) of the large-diameter portion 4.

The small-diameter portion 2 is a part for drilling a workpiece and a point angle of the small-diameter portion is set to 140°. The step portion 3 is a part for countersinking on a hole formed by the small-diameter portion 2 or drilling a hole larger in dimeter than the small-diameter portion 2 and a step angle of the step portion is set to 60°. The large-diameter portion 4 does not have the groove 5 formed in some area on the rear end side of the large-diameter portion and this area is constituted as a shank held by a machine tool.

The groove 5 (Refer to FIG. 1(b)) is a part constituting cutting faces of the first cutting edge 20 and second cutting edge 30 (Refer to FIG. 2(a)) described later and for discharging chips during machining of a workpiece. The groove 5 is a groove recessed toward the axis O in the circumferential surfaces of the small-diameter portion 2, the step portion 3, and the large-diameter portion 4 and is spirally formed with a constant lead from the small-diameter portion 2 to the large-diameter portion 4.

A description will be given to the first cutting edge 20 of the small-diameter portion 2 with reference to FIG. 1(b). FIG. 1(b) is a sectional view of the step drill 1 taken along line Ib-Ib of FIG. 1(a). The FIG. 1(b) shows a section (hereafter, referred to as "140°-section") cut along the same angle as the point angle (140°) of the small-diameter portion 2 and is obtained by projecting a section along a ridge of the first cutting edge 20 onto a plane. In FIG. 1(b), hatching is omitted for simplification of the drawing and this is the same with the FIG. 1(c) and the following drawings.

As illustrated in FIG. 1(b), three first cutting edges 20 are formed in a ridge portion where the tip face (flank) of the small-diameter portion 2 and the groove 5 intersect with each other and the three first cutting edges 20 are provided at equal angular intervals with the axis O at the center.

The first cutting edge 20 includes a convex blade part 20a formed on the circumferential end side of the first cutting edge and convex in the direction of rotation R of the small-diameter portion 2. The inner radius side of the first cutting edge 20 relative to the tip of the convex blade part 20a is formed in the shape of a curve concave toward the rear side of the direction of rotation R of the small-diameter portion 2.

A radial rake angle of the area from the tip of the convex blade part 20a facing the direction of rotation R to a circumferential corner 20b of the first cutting edge 20 (circumferential side of the convex blade part 20a) is set to a negative angle (−20° in this embodiment). That is, the tip of the convex blade part 20a is formed such that the tip is protruded toward the direction of rotation R than a straight line connecting the axis O and the circumferential corner 20b. This makes it possible to suppress cracking or chipping from occurring in the circumferential corner 20b during drilling by the first cutting edge 20 and enhance cutting quality of the first cutting edge 20.

A description will be given to a configuration of the groove 5 with reference to FIG. 1(c). FIG. 1(c) is a sectional view of the step drill 1 taken along line Ic-Ic of FIG. 1(a). FIG. 1(c) shows a 140°-section of the step portion 3. The sectional shape of the groove 5 in the step portion 3 is identical in some area on the inner radius side with the sectional shape of the small-diameter portion 2. This area is equivalent to the broken line D in FIG. 1(c) and this is the same with FIG. 2(a) and the following drawings. That is, the shape of the groove 5 in a 140°-section of the small-diameter portion 2 is identical with the shape of the area encircled with the broken line D in FIG. 1(c).

As illustrated in FIG. 1(c), the groove 5 includes a first ground portion 50 constituting the area on the leading edge 6 side of the step portion 3 and a second ground portion 51 constituting closer to the heel 7 side than the first ground portion 50 is. The groove 5 is formed in the shape of a curve concave toward the axis O by the first ground portion 50 and the second ground portion 51 but the point of intersection P between the first ground portion 50 and the second ground portion 51 is formed such that the point of intersection is convex toward the direction of rotation R. The point of intersection P is formed slightly on the inner radius side relative to the broken line D and this point of intersection P is a part that appears when the convex blade part 20a (Refer to FIG. 1(b)) of the first cutting edge 20 is formed during grinding of the groove 5.

That is, the sectional shape (convex shape) of the point of intersection P in a 140°-section is substantially identical with the shape of the convex blade part 20a in a 140°-section. (Refer to the enlarged portions in FIG. 1(b) and FIG. 1(c).) "Substantially" identical shape indicates that since chamfering is performed on the convex blade part 20a after formation of the groove 5, the shape of the actual convex blade part 20a and the shape of the point of intersection P are slightly different from each other. However, the ridge of the point of intersection P substantially identical in shape with the convex blade part 20a is formed in the groove 5 from the small-diameter portion 2 to the step portion 3.

A description will be given to the second cutting edge 30 of the step portion 3 with reference to FIGS. 2(a) and 2(b). FIG. 2(a) is a sectional view of the step drill 1 taken along line IIa-IIa of FIG. 1(a) and FIG. 2(b) is a partial enlarged side view schematically illustrating the step drill 1. FIG. 2(a) shows a section (hereafter, referred to as "60°-section") cut along a step angle (60°) of the step portion 3 and is obtained by projecting a section along a ridge of the second cutting edge 30 onto a plane.

Figure 2B:
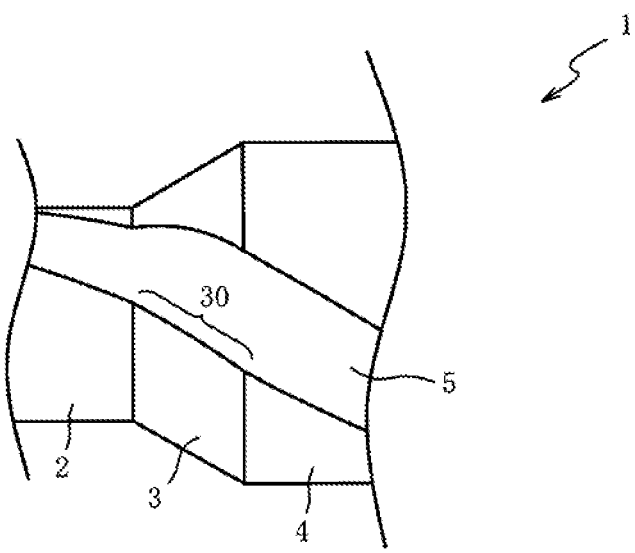
FIG. 2(b) is a partial enlarged side view schematically illustrating a step drill.

As illustrated in FIGS. 2(a) and 2(b), three second cutting edges 30 are formed in a ridge portion where the tip face (flank) of the step portion 3 and the groove 5 intersect with each other and the three second cutting edges 30 are provided at equal angular intervals with the axis O at the center. The second cutting edge 30 is substantially linearly formed from the inner radius-side end toward the circumferential end of the second cutting edge (from the small-diameter portion 2 side toward the large-diameter portion 4 side) in the 60°-section (as viewed from the tip of the step drill 1). That is, a part of the second cutting edge 30 on the circumferential end side is formed in the shape of a gentle curve convex toward the direction of rotation R but a radial rake angle θ of the circumferential end of the second cutting edge 30 is set to −20°.

Figure 4A:
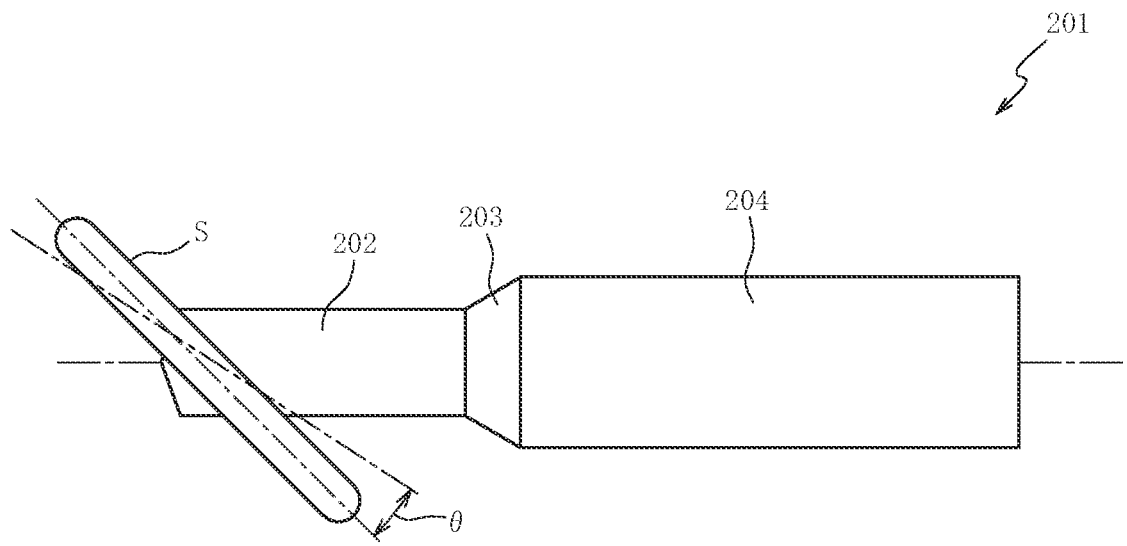
FIG. 4(a) is a schematic drawing illustrating a conventional method for grinding a groove in a step drill.
Figure 4B:
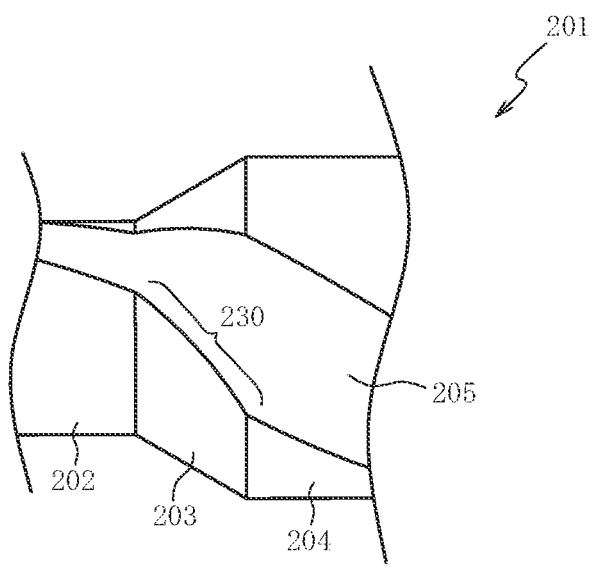
FIG. 4(b) is a partial enlarged side view of a conventional step drill.

As a result, occurrence of a surface roughness failure in a chamfered area or surface tearing can be suppressed when countersinking (chamfering on a hole drilled with the first cutting edge 20) is performed with the second cutting edge 30 unlike such a conventional step drill 201 as illustrated in FIG. 4(b). In the conventional step drill, the cutting edge 230 of the step portion 203 is formed in the shape of a curve convex toward the direction of rotation (a radial rake angle of the cutting edge 230 is a large negative angle).

Figure 3A:
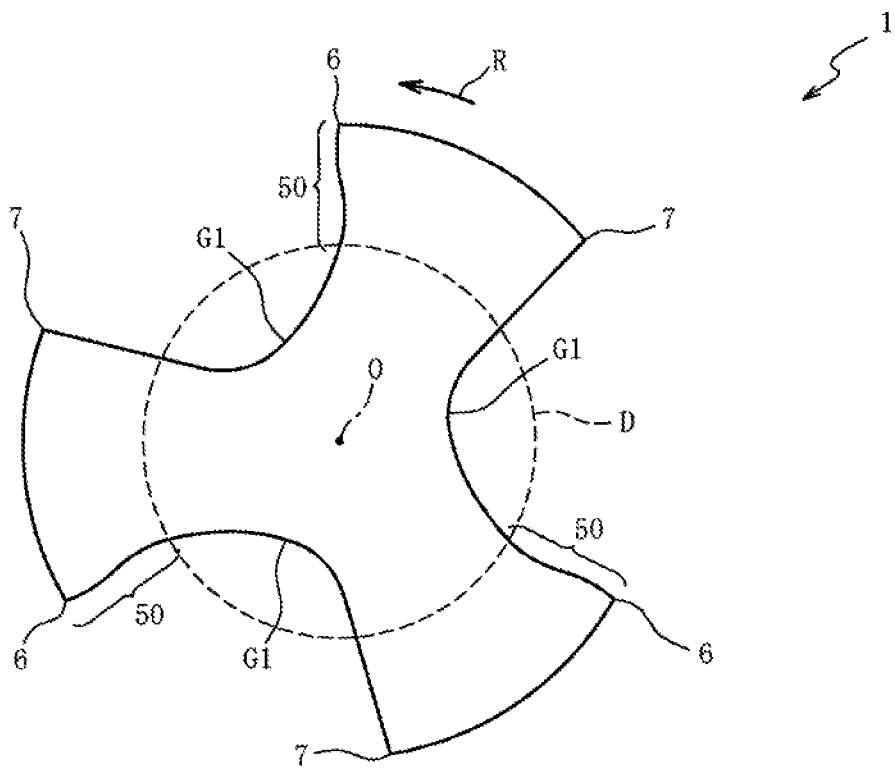
FIG. 3(a) is a sectional view of a step drill with a primary groove ground.
Figure 3B:
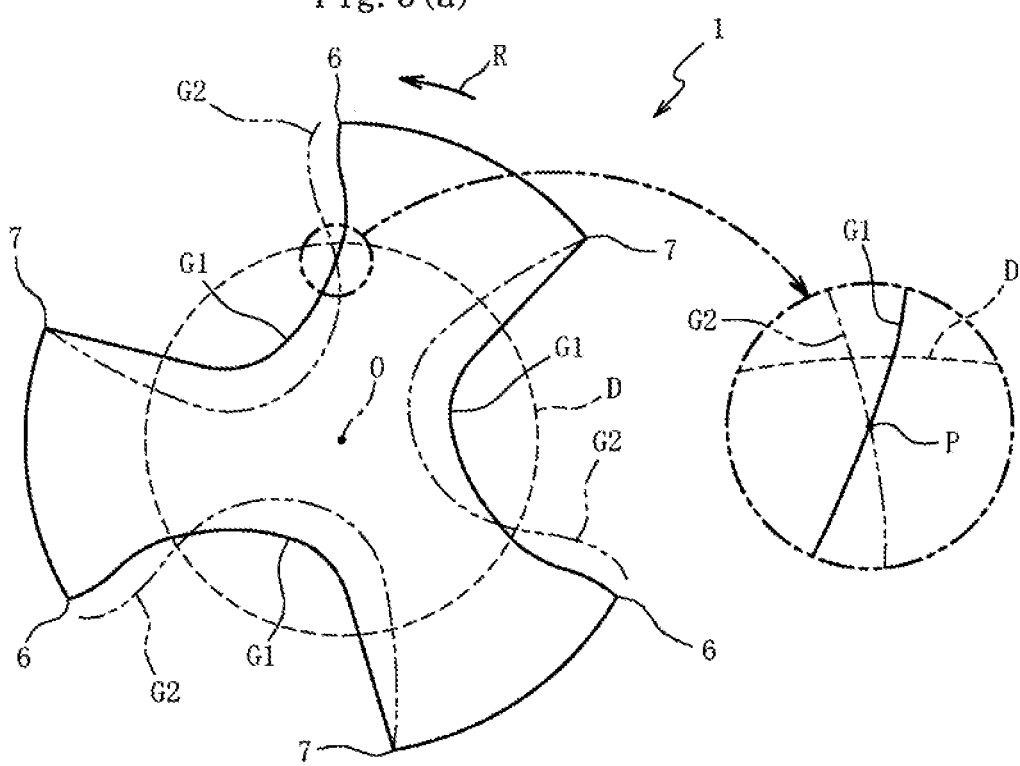
FIG. 3(b) is a sectional view of a step drill illustrating a method for grinding a secondary groove.

A description will be given to a manufacturing method for a step drill 1 with reference to FIGS. 3(a) and 3(b). FIG. 3(a) is a sectional view of the step drill 1 with a primary groove G1 ground and FIG. 3(b) is a sectional view of the step drill 1 illustrating a method for grinding a secondary groove G2. FIGS. 3(a) and 3(b) show the sectional shape of the groove 5 in a 140°-section. FIG. 3(b) shows a groove shape of the secondary groove G2 by an alternate long and two short dashes line.

As illustrated in FIGS. 3(a) and 3(b), the manufacturing method for the step drill 1 includes a first step of grinding the primary groove G1 (Refer to FIG. 3(a)) and a second step of grinding the secondary groove G2 (Refer to FIG. 3(b)). The first step and the second step are steps of forming the groove 5 by grinding with a grind stone to form the first cutting edge 20 and the second cutting edge 30 (determining a cutting edge shape according to a shape of the groove 5).

More specifically, the first step is a step of grinding the primary groove G1 toward the axis O more shallowly than a desired web thickness to grind an area embracing the first ground portion 50 of the groove 5. That is, the primary groove G1 is a groove for determining shapes of a part on the circumferential side of the convex blade part 20a of the first cutting edge 20 (area from the tip of the convex blade part 20a to the circumferential corner 20b) and the entire second cutting edge 30 and is spirally formed with a constant lead from the small-diameter portion 2 toward the step portion 3 (large-diameter portion 4).

The second step performed after the first step is a step of grinding the secondary groove G2 toward the axis O more deeply than the fillet of the primary groove G1 to grind the second ground portion 51 of the groove 5. That is, the secondary groove G2 is a groove for determining a shape of the first cutting edge 20 on the inner radius side relative to the tip of the convex blade part 20a and is spirally formed with a constant lead (the same lead as that of the primary groove G1) from the small-diameter portion 2 toward the step portion 3 (large-diameter portion 4).

In two passes, the first step and the second step, of groove grinding, the primary groove G1 and the secondary groove G2 are caused to intersect with each other slightly on the inner radius side relative to the broken line D (curved surfaces concave toward the rear side in the direction of rotation R are caused to intersect with each other). This makes it possible to form the convex blade part 20a (point of intersection P) convex toward the direction of rotation R on the circumferential end side of the first cutting edge 20 and further form the inner radius side relative to the convex blade part 20a in the shape of a curve concave toward the rear side of the direction of rotation R of the small-diameter portion 2 (that is, form the first cutting edge 20 into a hook-shaped cutting edge).

In this case, when the secondary groove G2 is ground, a grind stone can be suppressed from interfering with the first ground portion 50 (formed by the primary groove G1) by forming the convex blade part 20a with the primary groove G1 and the secondary groove G2 intersecting with each other. Thus, it is possible to form the second cutting edge 30 in a desired shape and further form the convex blade part 20a on the first cutting edge 20 by setting a sectional shape of the first ground portion 50 (primary groove G1) in a 60°-section such that a cutting edge shape of the second cutting edge 30 will be as desired.

A desired shape of the second cutting edge 30 is favorably a linear shape toward the circumferential end but only some area on the inner radius side may be linearly formed. A more specific description will be given. There are cases where the entire second cutting edge 30 is not used when countersinking (chamfering on a hole drilled with the first cutting edge 20) is performed with the second cutting edge 30. In such a case, the second cutting edge 30 only has to be linearly formed from the inner radius side toward the circumferential side at least in a size longer than the area where countersinking is performed. The second cutting edge 30 need not be in a perfect linear shape but may be formed in the shape of a gentle curve convex in the direction of rotation R. In cases where the second cutting edge 30 is formed in the shape of such a gentle curve, a radial rake angle of the circumferential end of the second cutting edge 30 only has to be set to an angle not less than such an angle (for example, −20°) that degradation in cutting performance can be suppressed.

In cases where a hole larger in diameter than a hole formed with the first cutting edge 20 is to be formed with the second cutting edge 30, it is desirable to linearly form the entire second cutting edge 30. However, the second cutting edge 30 need not be formed in the shape of a perfect straight line but may be formed in the shape of a gentle curve convex in the direction of rotation R. Also in this case, a radial rake angle of the circumferential end side of the second cutting edge 30 only has to be set to an angle not less than such an angle (for example, −20°) that degradation in cutting performance can be suppressed.

In cases where drilling is performed with the second cutting edge 30, as with the first cutting edge 20, a convex blade part (blade part convex toward the direction of rotation R) may be formed at the circumferential end of the second cutting edge 30. By forming a convex blade part on the second cutting edge 30, it is possible to suppress cracking or chipping from occurring at the circumferential end of the second cutting edge 30 during drilling with the second cutting edge 30 and enhance cutting quality of the second cutting edge 30.

That is, the second cutting edge 30 only has to be formed in a desired shape in accordance with purposes. Whatever shape the second cutting edge 30 is formed into, it is possible to form the convex blade part 20a on the first cutting edge 20 and further form the second cutting edge 30 into a desired shape by performing two passes of groove grinding as in this embodiment. In other words, a radial rake angle of the second cutting edge 30 can be set to a large angle (for example, −20° or above) as compared with cases where the convex blade part 20a is formed in one pass of groove grinding.

In cases where the convex blade part 20a is formed in two passes of groove grinding, a step of forming the primary groove G1 can also be adopted after the secondary groove G2 is ground first. At this step, however, it is necessary to form the second cutting edge 30 while adjusting a land width (width from the leading edge 6 to the heel 7) of the step portion 3. (When the primary groove G1 is ground to form the second cutting edge 30, a land width of the step portion 3 varies without exception.) Therefore, a high accuracy is required to grind the primary groove G1 (to form the second cutting edge 30 into a desired shape).

In this embodiment, meanwhile, the primary groove G1 is ground first and then the secondary groove G2 is ground; therefore, necessity for adjustment of a land width can be made obviated when the second cutting edge 30 is formed. As a result, the second cutting edge 30 can be easily formed into a desired shape as compared with cases where the secondary groove G2 is ground first and thus cutting performance of the second cutting edge 30 can be enhanced.

Up to this point, the present invention has been described based on the above embodiment but the present invention is not limited to the above embodiment and it is easily imagined that the present invention can be variously modified or improved without departing from the subject matter of the present invention. For example, the numeric values of the diameter and point angle of the small-diameter portion 2, the step angle of the step portion 3, the diameter of the large-diameter portion 4, the radial rake angle of the convex blade part 20a on the circumferential side, and the radial rake angle of the circumferential end of the second cutting edge 30 are just for examples and any other value may be set as appropriate.

In the description of the above embodiment, a case where the secondary groove G2 is ground after the primary groove G1 is taken as an example. The present invention is not limited to this and for example, the primary groove G1 may be ground after the secondary groove G2. Even in this case, the second cutting edge 30 can be formed into a desired shape by the primary groove G1 while forming the convex blade part 20a in the area of intersection between the secondary groove G2 and the primary groove G1.

The invention claimed is:

1. A step drill comprising:
a small-diameter portion having a first cutting edge at a tip portion of the small-diameter portion;
a tapered step portion connected to the axial rear end of the small-diameter portion and having a second cutting edge; and
a groove formed with a constant lead from the small-diameter portion to the step portion and recessed toward the axis of the small-diameter portion,
wherein the first cutting edge includes a convex blade part formed on the circumferential end side of the first cutting edge and convex in the direction of rotation of the small-diameter portion,
wherein the groove includes a first ground portion forming an area embracing the second cutting edge of the step portion and a second ground portion forming an area on the heel side of the step portion relative to the first ground portion, and
wherein the convex blade part is formed by the portion of intersection between the first ground portion and the second ground portion.

2. The step drill according to claim 1,
wherein the second cutting edge is substantially linearly formed toward the circumferential end of the second cutting edge.

3. A manufacturing method for a step drill including:
a small-diameter portion having a first cutting edge at a tip portion of the small-diameter portion;
a tapered step portion connected to the axial rear end of the small-diameter portion and having a second cutting edge;

a groove formed with a constant lead from the small-diameter portion to the step portion and recessed toward the axis of the small-diameter portion; and a convex blade part formed at the circumferential end of the first cutting edge and convex in the direction of rotation of the small-diameter portion, the manufacturing method comprising:

a groove grinding step which is a step of grinding the groove and at which the convex blade part convex in the direction of rotation of the small-diameter portion is formed on the circumferential end side of the first cutting edge, wherein the groove grinding step includes a first step of grinding a first ground portion forming an area embracing the second cutting edge of the step portion and a second step of grinding a second ground portion forming an area on the heel side of the step portion relative to the first ground portion, and wherein the convex blade part is formed by performing grinding with the first ground portion and the second ground portion intersecting with each other in two passes, the first step and the second step, of grinding.

4. The manufacturing method for the step drill according to claim 3, wherein at the first step, the second cutting edge is substantially linearly formed toward the circumferential end.

5. The manufacturing method for the step drill according to claim 4, wherein the second step is performed after the first step.

6. The manufacturing method for the step drill according to claim 3, wherein the second step is performed after the first step.

\* \* \* \* \*